United States Patent
Sébire et al.

(10) Patent No.: US 8,005,040 B2
(45) Date of Patent: Aug. 23, 2011

(54) RLC/MAC PROTOCOL

(75) Inventors: Benoist Sébire, Espoo (FI); Raino Lintulampi, Oulu (FI); Guillaume Sébire, Helsinki (FI)

(73) Assignee: Nokia Corporation, Espoo (FI)

(*) Notice: Subject to any disclaimer, the term of this patent is extended or adjusted under 35 U.S.C. 154(b) by 1000 days.

(21) Appl. No.: 10/476,704

(22) PCT Filed: May 7, 2001

(86) PCT No.: PCT/FI01/00433
§ 371 (c)(1),
(2), (4) Date: Dec. 9, 2003

(87) PCT Pub. No.: WO02/091763
PCT Pub. Date: Nov. 14, 2002

(65) Prior Publication Data
US 2004/0184434 A1    Sep. 23, 2004

(51) Int. Cl.
*H04W 4/00* (2009.01)
*G01R 31/08* (2006.01)
*H04B 7/00* (2006.01)
*H04B 7/212* (2006.01)
*H04J 1/00* (2006.01)
*H04J 3/16* (2006.01)
*H04J 3/12* (2006.01)
*H04L 12/28* (2006.01)

(52) U.S. Cl. ........ 370/329; 370/235; 370/310; 370/343; 370/395.43; 370/443; 370/469; 370/480; 370/522

(58) Field of Classification Search .................. None
See application file for complete search history.

(56) References Cited

U.S. PATENT DOCUMENTS

| | | | | |
|---|---|---|---|---|
| 6,167,029 A * | 12/2000 | Ramakrishnan | ............. | 370/235 |
| 6,262,974 B1 * | 7/2001 | Chevalier et al. | ............. | 370/232 |
| 6,470,010 B1 * | 10/2002 | Szviatovszki et al. | ........ | 370/356 |
| 6,850,540 B1 * | 2/2005 | Peisa et al. | ..................... | 370/468 |
| 6,901,060 B1 * | 5/2005 | Lintulampi | .................. | 370/329 |
| 6,967,963 B1 * | 11/2005 | Houh et al. | ................... | 370/428 |
| 7,126,939 B2 * | 10/2006 | Barany et al. | ................. | 370/352 |
| 2002/0187789 A1 * | 12/2002 | Diachina et al. | ............. | 455/452 |
| 2004/0196799 A1 * | 10/2004 | Terry | ............................ | 370/320 |
| 2006/0120530 A1 * | 6/2006 | Vialen et al. | .................. | 380/270 |

(Continued)

FOREIGN PATENT DOCUMENTS
WO    WO 01/33885 A1    5/2001

OTHER PUBLICATIONS

RLC/MAC Proposal for FACCH, SACCH and SDCCH. Tdoc Grean GAHW 010215 Agenda Item 6.1.3. 3GPP TSG GERAN Adhoc #5, Seatlle, WA, USA, May 7-11, 2001, Chapter 6,7.

(Continued)

*Primary Examiner* — Kwang B Yao
*Assistant Examiner* — Jutai Kao
(74) *Attorney, Agent, or Firm* — Squire, Sanders & Dempsey (US) LLP

(57) ABSTRACT

In the LAPDm a short message service is implemented by pre-emption of every second signalling message when there is a short message to be sent. Same pre-emption mechanism is also needed when the RLC/MAC protocol is used on the data link layer instead of the LAPDm. The mechanism is provided by defining at least two different identities to be used with frames transmitted on the signalling channel; and pre-empting frames on the MAC at least on the basis of the identity relating to a frame. The identities are preferably identified on the basis of the signalling radio bearer of the frame.

14 Claims, 2 Drawing Sheets

U.S. PATENT DOCUMENTS

2009/0103514 A1* 4/2009 Hwang et al. .............. 370/349

OTHER PUBLICATIONS

ETSI EN 300 937 V7.1.2 (Sep. 2000) Digital cellular telecommunications system (Phase 2+); Data Link (DL) layer; General Aspects (GSM 04.05 version 7.1.2 Release 1998), Chapter 4.2.5.

ETSI EN 124 011 V3.6.0 (Mar. 2001) Digital cellular telecommunications system (Phase 2+); (GSM); Universal mobile Telecommunications System (UMTS); Point-to-Point (PP) Short Message Service (SMS) support on mobile radio interface (3GPP TS 24,011 version 3.6.0 Release 1999).

* cited by examiner

RLC/MAC PROTOCOL

FIELD OF THE INVENTION

The present invention relates to implementing a message service in which user data may be sent between actual signalling, such as a short message service, according to RLC/MAC protocol (Radio Link Control/Media Access Control) in a mobile communication system, and particularly to implementing the message service according to RLC/MAC protocol on an SACCH (Slow Associated Control CHannel) which has a DPSCH (Dedicated Physical Sub-CHannel). The SACCH is an associated control channel in which one frame is available for control signalling in the direction in which the assigned channel is carrying traffic.

BACKGROUND OF THE INVENTION

A mobile communication system generally refers to any telecommunication system which enables wireless communication when a user is located within the service area of the system. Examples of such systems are cellular mobile communication systems, such as the GSM (Global System for Mobile communications), or corresponding systems, such as the PCS (Personal Communication System) or the DCS 1800 (Digital Cellular System for 1800 MHz), third-generation mobile systems, such as the UMTS (Universal Mobile Communication System), and systems based on the above mentioned systems, such as GSM 2+ systems and future fourth-generation systems. One typical example of a mobile communication system is a public land mobile network PLMN.

In addition to normal speech and data connections set up on traffic channels in digital mobile communication systems, short digital data messages comprising user data can be transmitted between actual signalling on control and signalling channels of a system. The main reason for this is to avoid frame stealing from the traffic channel. These short digital data messages comprising user data are generally referred to as short messages. In the GSM, control channels used for short message transmissions are the SACCH used for transmission of measurements performed by a mobile station MS during the connection and an SDCCH (Stand alone Dedicated Control Channel) carrying out the actual signalling. If a mobile station has a connection on a traffic channel, short messages are forwarded on the SACCH, otherwise they are forwarded on the SDCCH.

In the GSM, short message service has been implemented by using LAPDm (Link Access Protocol for the Dm channel) protocol in the data link layer, i.e. layer 2. The LAPDm provides services to an upper layer, layer 3, via Service Access Points (SAP), which are identified by a Service Access Point Identifier (SAPI). The LAPDm has two different values for the SAPI. Signalling is transferred in SAPI=0 frames using unacknowledged mode operation on the SACCH associated with a traffic channel. Short messages are transferred in SAPI=3 frames using acknowledged mode operation on the SACCH associated with a traffic channel. The LAPDm acknowledged mode operation prioritizes messages from a layer 3 entity, so that if a SAPI=3 frame, i.e. a short message, is waiting for transmission, two SAPI=0 frames are not sent in consecutive frames. It is also ensured that at least one SAPI=0 frame is transmitted after a SAPI=3 frame. In other words, short messages are transmitted on the SACCH associated with a traffic channel by pre-emption of every second signalling frame, i.e. SAPI=0 frame.

However, in a GSM 2+-system called GERAN (GSM/EDGE (Enhanced Data rates for Global Evolution) Radio Access Network) Release 5, it has been suggested to use the RLC/MAC protocol instead of the LAPDm in order to make the protocol stacks less complicated. One of the problems associated with the replacement of the LAPDm with the RLC/MAC is that there is no support in the RLC/MAC for the pre-emption mechanism illustrated above.

BRIEF DESCRIPTION OF THE INVENTION

An object of the present invention is thus to provide a method and a system for implementing the method so as to solve the above problem. The object of the invention is achieved by a method and a system which are characterized by what is stated in the independent claims. The preferred embodiments of the invention are disclosed in the dependent claims.

The invention is based on realizing the problem and providing the RLC/MAC protocol with a mechanism for pre-empting the signalling frames by defining at least two different identifiers, preferably signalling radio bearer identifiers, the first indicating a signalling message and the second indicating a possible short message and modifying the protocol to pre-empt every second frame with the first identifier.

An advantage of the invention is that it allows transmission of short messages as if the LAPDm were used, and thus there is no need to steal speech frames for the short message transmission, for example. Another advantage is that the physical layer of the SACCH can be kept as it is.

BRIEF DESCRIPTION OF THE DRAWINGS

In the following, the invention will be described in greater detail by means of preferred embodiments with reference to the attached drawings, in which.

DETAILED DESCRIPTION OF THE INVENTION

The present invention can be applied to any communication system where short message service, or a corresponding user data message service transmitted between the signalling on signalling channels, is provided by the RLC/MAC protocol. Such systems include the above-mentioned systems, for example. In the following, the invention will be described by using a GERAN system as an example, without restricting the invention thereto.

Figure 1:
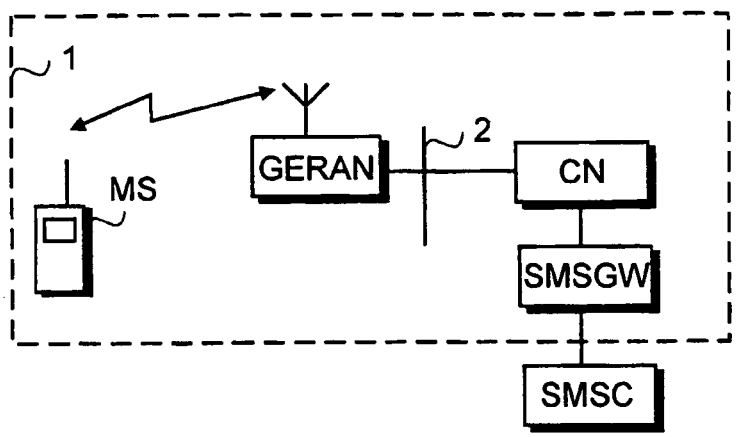
FIG. 1 illustrates basic parts of a communication system.

FIG. 1 shows a very simplified network architecture illustrating only basic parts of the communication system 1. It is obvious to a person skilled in the art that the system 1 comprises network nodes, functions and structures, which need not be described in greater detail here.

A mobile station MS comprises the actual terminal and a detachably connected identification card SIM, also called a subscriber identity module. In this context, the mobile station generally means the entity formed by the subscriber identity module and the actual terminal. The MS can be any equipment capable of communicating in a mobile communication system and supporting the short message service or a corresponding service.

In the example of FIG. 1, the system 1 comprises a core network CN and a radio access network GERAN. The GERAN is formed of a group of radio network subsystems (not shown in FIG. 1), which are connected to the core network CN via an Iuinterface 2. The GERAN may be a GSM/EDGE Radio Access Network and the CN may be a GSM/UMTS core network.

For the short message service, the system 1 comprises a short message service gateway SMSGW having a connection to a short message service centre SMSC. The short message service gateway SMSGW is a common term for a Gateway Mobile Switching Centre for Short Message Service SMS-GMSC and an Interworking Mobile Switching Centre for Short Message Service SMS-IWMSC. The SMS-GMSC receives a short message from the SMSC, requests routing information and delivers the short message through the CN and the GERAN to the mobile station MS. Correspondingly the SMS-IWMSC can receive short messages from a mobile station to be forwarded to the short message service centre SMSC.

Figure 2:
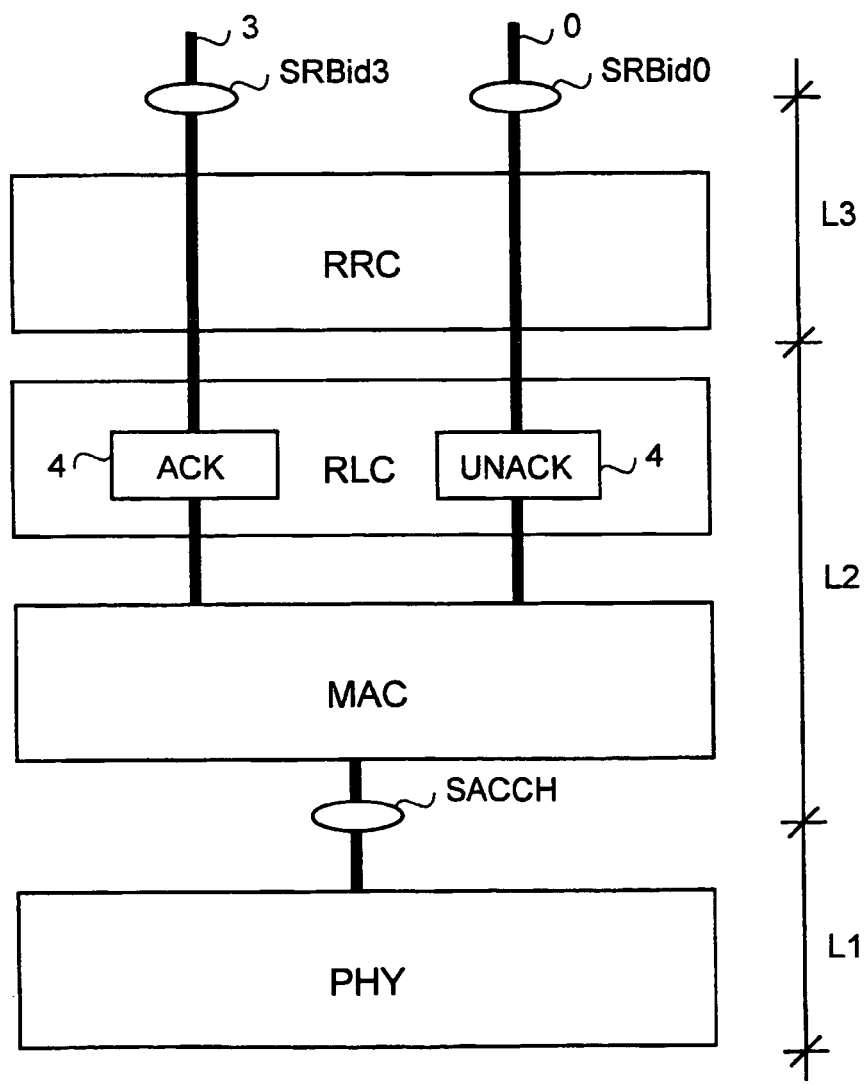
FIG. 2 shows a protocol architecture according to a first preferred embodiment of the invention.

FIG. 2 shows the Iu-interface protocol architecture of the SACCH having the DPSCH according to the first preferred embodiment of the invention. The protocol stack shown in FIG. 2 is a protocol stack of a control plane. The corresponding layers and sublayers implemented according to the invention may be used in other interfaces, too. The thick lines between the layers and the sub-layers illustrate possible data flows, and the circles illustrate service access points for peer-to-peer communication.

The Iu-interface protocol architecture illustrated in FIG. 2 comprises three protocol layers: a physical layer L1, the data link layer L2 and a network layer L3. The data link layer L2 comprises the following sublayers below an RRC (Radio Resource Control) of the layer L3: the radio link control RLC and the medium access control MAC.

The RRC has a control interface (not shown in FIG. 2) between the RRC and the RLC, between the RRC and the MAC, and between the RRC and the L1. These interfaces allow the RRC to control the configuration of the lower layers.

The RRC according to the invention provides in the control plane at least two different signalling radio bearers 0, 3, one of which is used among other things for the short message service or a corresponding user data message service and the other is used for signalling. Each signalling radio bearer is identified by a signalling radio bearer identity SRBid, or a corresponding identity which can be mapped one-to-one with an associated signalling radio bearer. In the first and the second preferred embodiment of the invention, SRBid 0 corresponds to the SAPI=0 of the LAPDm, and SRBid 3 corresponds to the SAPI=3 of the LAPDm. The RRC of the invention configures the RLC and the MAC accordingly via the interfaces. The signalling radio bearers may be configured at RRC Connection Setup and remain until the RRC connection is released, for example. Another possibility is that the signalling radio bearers use a predefined default configuration. In other words, the RRC of the invention differs from the prior art RRC in that it reserves at least two signalling radio bearers for a connection.

The RLC provides the upper layer L3 with among other things, acknowledged and unacknowledged data transfer. The RLC of the invention provides acknowledged data transfer for those messages the frame header of which comprises the signalling radio bearer identity used also for short messages, i.e. SRBid 3 frames in the first and the second preferred embodiment of the invention. The unacknowledged data transfer is provided for signalling messages, i.e. SRBid 0 frames in the first and the second preferred embodiment of the invention. An RLC entity 4 is established preferably for each signalling radio bearer, i.e. for each identity, as soon as there is a frame to be sent, and the entity exists preferably until the corresponding DSPCH is released.

The MAC handles the access to and multiplexing onto the physical sub-channels, thus defining among other things logical channels to be used for each radio bearer service. The MAC is also responsible for the MS measurement reporting. For a mobile station MS, there is one MAC entity in the mobile station side and one in the network side. The MAC according to the first preferred embodiment of the invention will pre-empt every second frame having signalling radio bearer identity indicating a signalling message in case there is a frame having the other signalling radio bearer identity. In other words, the MAC provides, in the Iumode, priority handling between traffic flows on the basis of the signalling radio bearer identities.

Figure 3:
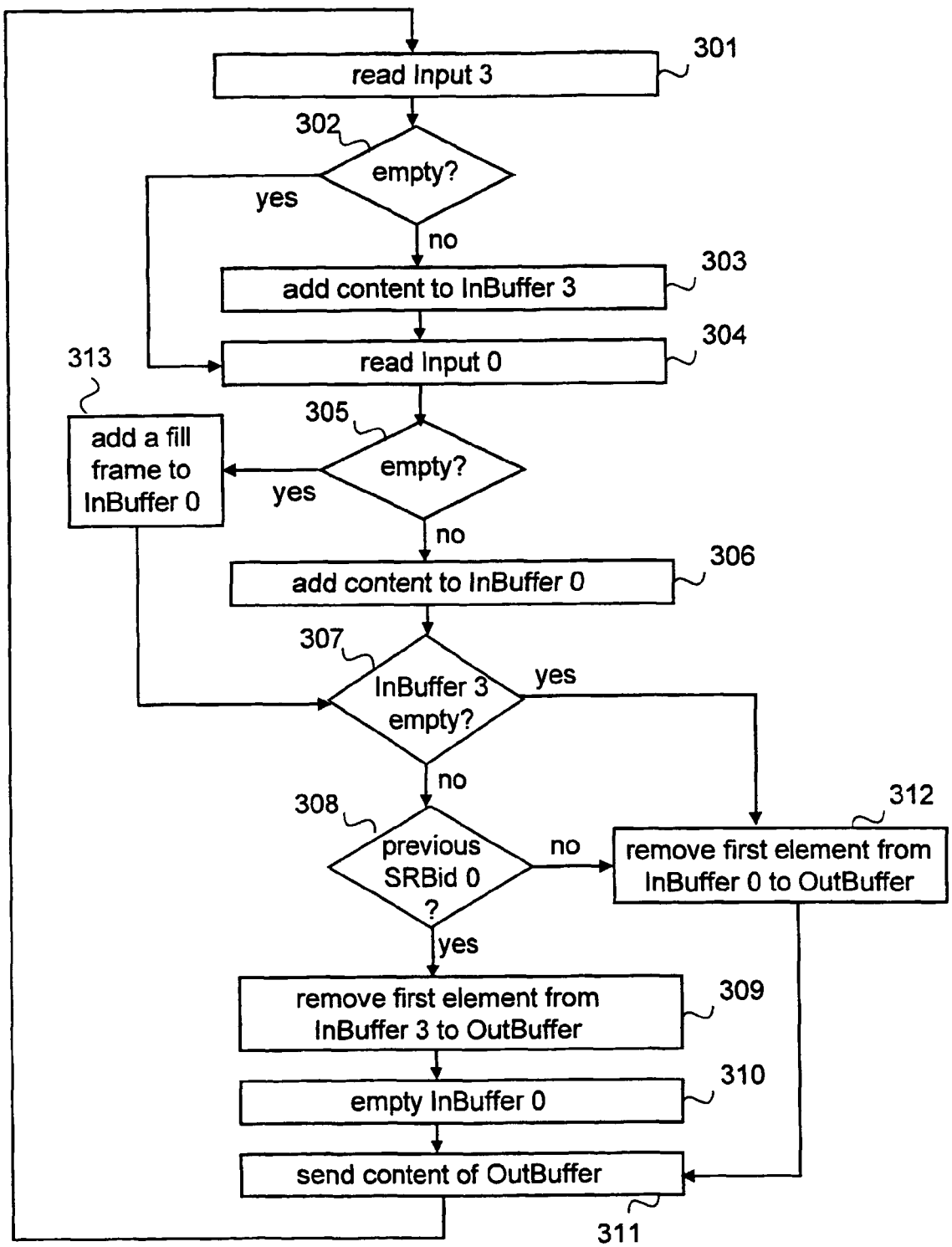
FIG. 3 is a flow chart illustrating the operations of the MAC according to the first preferred embodiment of the invention.

The operation of the MAC protocol in the first preferred embodiment of the invention is illustrated in FIG. 3. For the sake of clarity, the figure does not mention the header information and the like added by the MAC to the received information. The functionality described in FIG. 2 is performed in each cycle, i.e. in the GERAN something is sent on the SACCH every 480 ms. If there is no measurement reports to be sent, a fill frame is sent. In the first preferred embodiment of the invention, it is assumed that the fill frame is generated at the MAC layer. In some other embodiments of the invention, the fill frame may be generated in the RLC or in the RRC level.

In the first preferred embodiment of the invention there are two inputs in the MAC, input 0 for SRBid 0 frames and input 3 for SRBid 3 frames, and three buffers: one input buffer called InBuffer 0 for SRBid 0 frames, another input buffer called InBuffer 3 for SRBid 3 frames, and an output buffer called OutBuffer. InBuffer 3 is a FIFO type buffer.

Referring to FIG. 3, the MAC reads input 3 for SRBid 3 frames in step 301, and if input 3 is not empty (step 302), it adds, in step 303, the content of input 3 to InBuffer 3 and reads, in step 304, input 0 for SRBid 0 frames. The MAC will proceed to the same step 304, if input 3 was empty (step 302). If input 0 is not empty (step 305), the MAC adds, in step 306, the content of input 0 to the InBuffer 0. After that the MAC checks, in step 307, if InBuffer 3 is empty. If not, the MAC checks, in step 308, whether the frame sent in the previous cycle was an SRBid 0 frame. If it was, the MAC removes, in step 309, the first element in InBuffer 3 from InBuffer 3 to the OutBuffer and empties, in step 310, InBuffer 0 and sends, in step 311, the content of the OutBuffer on the SACCH. In other words, the pre-emption of an SRBid 0 frame in the first preferred embodiment of the invention occurs in step 310. It is performed by a pre-emption function, which can be called a pre-emptor.

If the frame sent in the previous cycle was not an SRBid 0 frame (step 308), or if InBuffer 3 is empty (step 307), the MAC removes, in step 312, the element in InBuffer 0 from InBuffer 0 to the OutBuffer and sends, in step 311, the content of the OutBuffer on the SACCH.

If input 0 was empty (step 305), the MAC adds, in step 313, a fill frame to InBuffer 0 and continues to step 307 to check if InBuffer 3 is empty. The fill frame is added (step 313) for continuous transmission on the SACCH.

In another embodiment of the invention, the SRBid 3 frames are not buffered in the MAC. In the embodiment, the MAC acknowledges the corresponding RLC entity, when an SRBid 3 frame was sent, and the RLC sends another SRBid 3 frame only after it has received the acknowledgement. The acknowledgement may be performed between steps 309 and 310 of FIG. 3, for example.

Thus the MAC according to the first preferred embodiment of the invention discards half of the SRBid 0 frames whenever there is an SRBid 3 frame to be transferred simply by replacing one SRBid 0 frame with an SRBid 3 frame. In other words, the SRBid 3 frame steals bandwidth from SRBid 0 frames on the SACCH.

The MAC according to the second preferred embodiment of the invention utilizes the round robin principles, which are well known by a person skilled in the art. Thus, in the second preferred embodiment of the invention the MAC sends a frame from InBuffer 0, then from InBuffer 3 if it contains a frame, then again a frame from InBuffer 0, etc. In InBuffer 0 there are SRBid 0 frames. In InBuffer 3 there are SRBid 3 frames. The inBuffers are emptied according to the FIFO principle.

Although the invention has been described above by assuming that there are buffers in the MAC, it is obvious to one skilled in the art that the invention can be applied without buffers.

Although the invention has been described by assuming that there are only two signalling radio bearers (and signalling radio bearer identities), the invention can be applied to any pre-emption mechanisms between several radio bearers by pre-empting the low priority frame by one with higher priority.

In addition to prior art means, the system implementing the functions of the present invention and the network nodes of this system comprise means for providing pre-emption of user data sent in signalling channels. More precisely, the network nodes may comprise means for implementing the functions described above. The current network nodes comprise processors and memory, which can be utilized in the functions according to the invention. All changes necessary for implementing the invention can be made as added or updated software routines, by means of application-specific integrated circuits (ASIC) and/or programmable circuits, such as EPLD, FPGA.

It will be obvious to a person skilled in the art that as the technology advances, the inventive concept can be implemented in various ways. The invention and its embodiments are not limited to the examples described above but may vary within the scope of the claims.

The invention claimed is:

1. A method, comprising:
reserving at least two different signaling radio bearers for a connection on one control plane signaling channel of a mobile communication system, the at least two different signaling radio bearers being control plane radio bearers and having different signaling radio bearer identities, a signaling radio bearer identity being other than a service access point identifier and indicating a content type that may be sent over a corresponding signaling radio bearer;
indicating a control plane frame that contain signaling by a first signaling radio bearer identity;
indicating a control plane frame that may contain user data by a second signaling radio bearer identity;
checking whether a control plane frame sent in a previous cycle was associated with the first signaling radio bearer identity; and
pre-empting control plane frames on a media access control sublayer of a data link layer, wherein the pre-empting comprises discarding every second control plane frame relating to the first signaling radio bearer identity when the control plane frame sent in the previous cycle was associated with the first signaling radio bearer identity and there is a control plane frame relating to the second signaling radio bearer identity to be transmitted.

2. A method according to claim 1, further comprising:
storing control plane frames relating to the first signaling radio bearer identity in a first buffer;
storing control plane frames relating to the second signaling radio bearer identity in a second buffer; and
emptying the first buffer when the control plane frame sent in the previous cycle was associated with the first signaling radio bearer identity.

3. A method according to claim 1, further comprising:
reserving the same amount of radio signaling bearers for a connection as there are defined signaling radio bearer identities;
mapping each signaling radio bearer identity to a signaling radio bearer; and
identifying the identity of a control plane frame in the media access control on the basis of the signaling radio bearer of the control plane frame.

4. A system comprising:
a control plane signaling channel on which control plane frames may be transmitted;
an interface in which a media access control protocol is used in a data link layer;
at least two different signaling radio bearers to be reserved for a connection on the control plane signaling channel, the at least two different signaling radio bearers being control plane radio bearers and having different signaling radio bearer identities, a signaling radio bearer identity being other than a service access point identifier and indicating a content type that may be sent over a corresponding signaling radio bearer;
wherein the system is configured to associate a control plane frame that contains signaling with a first signaling radio bearer identity, associate a control plane frame that may contain user data with a second signaling radio bearer identity, and check whether a control plane frame sent in a previous cycle was associated with the first signaling radio bearer identity; and
a pre-emptor configured to pre-empt control plane frames on the media access control sublayer by discarding every second control plane frame relating to the first signaling radio bearer identity when the control plane frame sent in the previous cycle was associated with the first signaling radio bearer identity and there is a control plane frame relating to the second signaling radio bearer identity to be transmitted,
wherein the system is further configured to provide a service transmitting user data on a control plane signaling channel.

5. A system according to claim 4, wherein at least one of the signaling radio bearers is also used to transmit the user data, and at least one of the signaling radio bearers is used to transmit only signaling and the latter one is pre-empted.

6. An apparatus comprising:
using means for using a media access control protocol in a data link layer comprising a media access control sublayer,
providing means for providing at least two signaling radio bearers for a connection on a control plane signaling channel,
indicating means for indicating a control plane frame that contain signaling by a first signaling radio bearer identity other than a service access point identifier,
indicating means for indicating a control plane frame that may contain user data by a second signaling radio bearer identity other than a service access point identifier, checking means for checking whether a control plane frame sent in a previous cycle was associated with the first signaling radio bearer identity; and pre-empting means for pre-empting control plane frames on the media access control sublayer, wherein the pre-empting means comprises means for discarding every second control plane frame relating to the first signaling radio bearer identity when the control plane frame sent in the previous cycle was associated with the first signaling radio bearer identity and there is a control plane frame relating to the second signaling radio bearer identity to be transmitted.

7. The apparatus as claimed in claim 6, further comprising a processor configured to be the pre-empting means for pre-empting frames.

8. An apparatus comprising:

an interface configured to use a media access control protocol in a data link layer comprising a media access control sublayer, the interface being configured to provide two or more different signaling radio bearers for a connection, the two or more different signaling radio bearers being control plane radio bearers, wherein the interface is configured to associate a control plane frame that contains signaling with a first signaling radio bearer identity, associate a control plane frame that may contain user data with a second signaling radio bearer identity, the first signaling radio bearer identity and the second signaling radio bearer identity being other than service access point identifiers, and check whether a control plane frame sent in a previous cycle was associated with the first signaling radio bearer identity; and a pre-emptor configured to pre-empt control plane frames on the media access control sublayer by discarding every second control plane frame relating to the first signaling radio bearer identity when the control plane frame sent in the previous cycle was associated with the first signaling radio bearer identity and there is a control plane frame relating to the second signaling radio bearer identity to be transmitted.

9. The apparatus as claimed in claim 8, wherein the pre-emptor is a processor configured to pre-empt frames.

10. The apparatus as claimed in claim 8, wherein the pre-emptor is configured to discard every second control plane frame transmitted on a signaling radio bearer transmitting only signaling whenever there is a control plane frame to be transmitted on a control plane signaling radio bearer transmitting also user data.

11. An interface comprising:

a data link layer comprising a media access control sublayer using a media access control protocol, providing means for providing two or more different signaling radio bearers for a connection on a control plane signaling channel, the two or more different signaling radio bearers being control plane radio bearers, indicating means for indicating a control plane frame that contain signaling by a first signaling radio bearer identity other than a service access point identifier;

indicating means for indicating a control plane frame that may contain user data by a second signaling radio bearer identity other than a service access point identifier;

checking means for checking whether a control plane frame sent in a previous cycle was associated with the first signaling radio bearer identity; and a pre-emption function for pre-empting control plane frames on the media access control sublayer by discarding every second control plane frame relating to the first signaling radio bearer identity when the control plane frame sent in the previous cycle was associated with the first signaling radio bearer identity and there is a control plane frame relating to the second signaling radio bearer identity to be transmitted.

12. An interface comprising:

a data link layer comprising a media access control sublayer using a media access control protocol;

wherein the interface is configured to associate a control plane frame that contains signaling with a first signaling radio bearer identity, associate a control plane frame that may contain user data with a signaling radio bearer second identity, and check whether a frame sent in a previous cycle was associated with the first signaling radio bearer identity; and a pre-emptor configured to pre-empt control plane frames on the media access sublayer by discarding every second control plane frame relating to the first signaling radio bearer identity when the control plane frame sent in the previous cycle was associated with the first signaling radio bearer identity and there is a control plane frame relating to the second signaling radio bearer identity to be transmitted, wherein the interface is configured to provide two or more different signaling radio bearers for a connection and signaling radio bearer identities are other than service access point identifiers.

13. An interface according to claim 12, wherein the pre-emptor is configured to discard every second control plane frame transmitted on a control plane signaling radio bearer transmitting only signaling whenever there is a control plane frame to be transmitted on a control plane signaling radio bearer transmitting also user data.

14. A method comprising:

using a media access control protocol in a data link layer comprising a media access control sublayer, providing at least two signaling radio bearers for a connection on a control plane signaling channel of a mobile communication system, the at least two signaling radio bearers being control plane radio bearers, associating each of said at least two signaling radio bearers with a signaling radio bearer identifier identifying the signaling radio bearer and indicating a content type that may be sent over the signaling radio bearer, the signaling radio bearer identifier being other than a service access point identifier;

indicating a control plane frame of an unacknowledged data transfer and containing only signaling by a first signaling radio identity;

indicating a control plane frame of an acknowledged data transfer and possibly containing user data by a second signaling radio bearer identity;

checking whether a control plane frame sent in a previous cycle was associated with the first signaling radio bearer identity; and pre-empting control plane frames on the media access control sublayer, wherein the pre-empting comprises discarding every second control plane frame relating to the first signaling radio bearer identity when the control plane frame sent in the previous cycle was associated with the first signaling radio bearer identity and there is a control plane frame relating to the second signaling radio bearer identity to be transmitted.

* * * * *